(12) United States Patent
Zagoroff

(10) Patent No.: US 7,240,946 B2
(45) Date of Patent: Jul. 10, 2007

(54) SYSTEM FOR COUNTERBALANCING A TAILGATE

(76) Inventor: Dimiter S. Zagoroff, 55 Winter St., Lincoln, MA (US) 01773

( * ) Notice: Subject to any disclaimer, the term of this patent is extended or adjusted under 35 U.S.C. 154(b) by 0 days.

(21) Appl. No.: 11/061,988

(22) Filed: Feb. 18, 2005

(65) Prior Publication Data

US 2005/0179279 A1    Aug. 18, 2005

Related U.S. Application Data

(60) Provisional application No. 60/546,102, filed on Feb. 18, 2004.

(51) Int. Cl.
*B62D 33/03*    (2006.01)
(52) U.S. Cl. .................... 296/57.1; 16/308
(58) Field of Classification Search ............... 296/50, 296/52, 57.1; 292/216, DIG. 23, DIG. 29, 292/DIG. 43; 414/537, 545, 557; 267/154, 267/273; 49/386; 16/308; 257/154, 273
See application file for complete search history.

(56) References Cited

U.S. PATENT DOCUMENTS

| | | | |
|---|---|---|---|
| 2,799,891 A * | 7/1957 | Ragsdale ..................... 16/308 |
| 2,984,517 A * | 5/1961 | Farrow et al. ................ 297/57 |
| 3,023,042 A * | 2/1962 | Hill ............................ 292/276 |
| 3,336,070 A * | 8/1967 | Jackson ..................... 296/57.1 |
| 3,612,601 A * | 10/1971 | Himka et al. .................. 296/51 |
| 3,643,378 A * | 2/1972 | Velavicius et al. ............. 49/445 |
| 3,695,678 A * | 10/1972 | Gergoe ......................... 296/76 |
| 4,143,904 A * | 3/1979 | Cooper et al. ............. 296/57.1 |
| 4,585,265 A | 4/1986 | Mader |
| 5,234,249 A | 8/1993 | Dorrell |
| 5,358,301 A | 10/1994 | Konchan et al. |
| D370,453 S * | 6/1996 | Shortman et al. .......... D12/223 |
| 5,645,310 A | 7/1997 | McLaughlin |
| 5,851,049 A | 12/1998 | Squire et al. |
| 5,988,724 A | 11/1999 | Wolda |
| 6,048,018 A * | 4/2000 | Shambeau et al. ......... 296/57.1 |
| 6,357,813 B1 | 3/2002 | Vandeberghe et al. |
| 6,450,559 B1 | 9/2002 | Renke |
| 6,619,723 B2 * | 9/2003 | Duffy ..................... 296/146.11 |
| 6,637,796 B1 | 10/2003 | Westerdale et al. |
| 6,676,196 B1 | 1/2004 | Smith |
| 6,769,729 B1 * | 8/2004 | Bruford et al. ................ 296/50 |
| 6,793,263 B1 * | 9/2004 | Bruford et al. ................ 296/50 |
| 6,796,592 B1 * | 9/2004 | Austin ........................ 296/57.1 |
| 6,811,208 B1 * | 11/2004 | Kettinger .................. 296/146.8 |
| 6,832,801 B2 | 12/2004 | Zagoroff |
| 6,846,030 B2 * | 1/2005 | Koehler et al. ............... 296/50 |
| 6,857,679 B2 | 2/2005 | Zagaroff |
| 6,874,837 B2 * | 4/2005 | Bruford et al. ................ 296/50 |
| 6,905,156 B2 * | 6/2005 | Miller et al. ................... 296/50 |
| 6,976,723 B2 * | 12/2005 | Libby ........................... 296/50 |
| 2005/0179279 A1 * | 8/2005 | Zagoroff ....................... 296/50 |

(Continued)

*Primary Examiner*—D. Glenn Dayoan
*Assistant Examiner*—Paul Chenevert
(74) *Attorney, Agent, or Firm*—Hamilton, Brook, Smith & Reynolds, P.C.

(57) ABSTRACT

A counterbalancing system is provided that can be easily installed to an exterior of a tailgate and provides a mechanism for arresting the tailgate in an open position. The system includes a stop assembly coupled to the vehicle and a counterbalance assembly adapted to be coupled in a pretensioned position to an outer periphery of the tailgate, the counterbalance assembly providing a counterbalance force when engaged with the stop assembly while the tailgate is opened or closed.

26 Claims, 4 Drawing Sheets

U.S. PATENT DOCUMENTS

| | | | |
|---|---|---|---|
| 2005/0194808 A1* | 9/2005 | Austin | 296/50 |
| 2005/0200150 A1* | 9/2005 | Austin | 296/50 |
| 2006/0055197 A1* | 3/2006 | Austin | 296/50 |
| 2006/0082181 A1* | 4/2006 | Austin | 296/57.1 |

* cited by examiner

SYSTEM FOR COUNTERBALANCING A TAILGATE

RELATED APPLICATION

This application claims the benefit of U.S. Provisional Application No. 60/546,102, filed on Feb. 18, 2004 the entire teachings of that are incorporated herein by reference.

BACKGROUND OF THE INVENTION

Typically, a tailgate is pivotally mounted between body side panels forming the pillars at the rear of the vehicle. The tailgate pivots about a hinge axis between a horizontal, open position and a vertical, closed position. Preferably, the mounting assemblies for the tailgate permit the tailgate to be removed, removal typically being accomplished when the tailgate is pivoted to a position between the fully open or fully closed position. For example, the tailgate may include hinge pins that extend outwardly along the hinge axis that removably connect into brackets carried on the truck body. When the tailgate is pivoted to a predetermined intermediate position, for example, 15° away from the fully closed position, at least one of the hinge pins slips through a slot in the connecting bracket as the tailgate is lifted at one end from the truck body.

Some of the tailgate mounting assemblies include counterbalance mechanisms, such as torque rods for assisting with the opening and closing of the tailgate. These torque rods are located, at least in part, within the tailgate for spring biasing between the tailgate and the body panel pillars. These torque rods typically require numerous components to assemble the torque rod to the tailgate.

In some instances, it may be desirable to keep the tailgate in the open position, such as for transporting material having a greater length than vehicle's bed. As such, the tailgate can be susceptible to closing by way of the counterbalancing mechanism. For example, the tailgate might bounce in a direction toward closure if the vehicle were to inadvertently go over a bump or into a pothole, and the counterbalancing mechanism would then assist in potentially closing the tailgate.

SUMMARY OF THE INVENTION

The present invention provides a counterbalancing system that can be easily installed to an exterior of a tailgate and provide a mechanism for arresting the tailgate in an open position. The system includes a stop assembly coupled to the vehicle and a counterbalance assembly adapted to be coupled in an optional pretensioned position to an outer periphery of the tailgate, the counterbalance assembly providing a counterbalance force when engaged with the stop assembly while the tailgate is opened or closed.

The stop assembly can be adapted to be coupled to an existing hinge pin of the vehicle. The stop assembly can include a semicircular groove for slidably engaging the counterbalance assembly.

The counterbalance assembly can include a spring member comprising a first portion and a second portion that extends traversely from the first portion. The second portion can include a first notch positioned proximal to and below an end of the spring member for engaging the stop assembly and arresting the tailgate in a first position, wherein the first position can allow the tailgate to be arrested in a partially opened position. The second portion can further include a second notch positioned proximal to and below the first notch for engaging the stop assembly and arresting the tailgate in a second position, wherein the second position can allow the tailgate to be arrested in a fully opened position. The spring member can be a torque rod.

The stop assembly and the counterbalance assembly can be coupled as not to interfere with removal of the tailgate from the vehicle. The stop assembly and or the counterbalance assembly can be adapted to be spring-loaded for ease of installation of the tailgate to the vehicle.

BRIEF DESCRIPTION OF THE DRAWINGS

The foregoing and other objects, features and advantages of the invention will be apparent from the following more particular description of preferred embodiments of the invention, as illustrated in the accompanying drawings in that like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Generally, an externally mounted counterbalance mechanism is provided to assist with the opening and closing of a tailgate of a vehicle, such as a truck, minivan, station wagon, etc. The counterbalance mechanism can also include a series of safety stops that arrest the tailgate in predetermined positions.

Figure 1B:
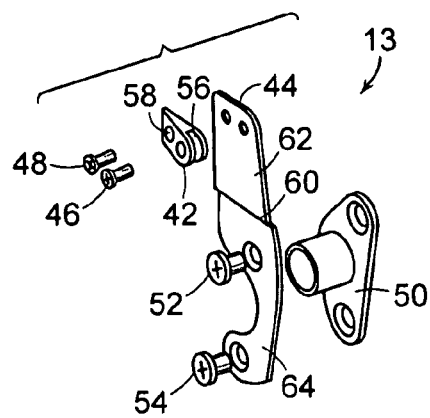
FIG. 1B shows an exploded perspective view a stop assembly of the present invention.
Figure 1A:
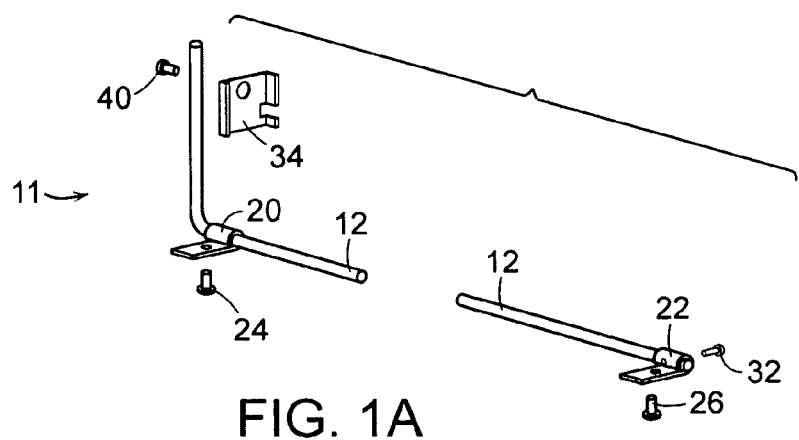
FIG. 1A shows an exploded perspective view of a counterbalance assembly of the present invention.

FIG. 1A shows an exploded perspective view of a counterbalance assembly 11 of the present invention. The counterbalance assembly 11 includes a spring member 12, a plurality of brackets (20, 22, 34), and bracket screws (24, 26, 32, 40) for attaching the counterbalance assembly 11 to an exterior of the tailgate in an optional pretensioned position as will be explained in further detail below. In one embodiment, the spring member 12 is a torque rod. The material used for the spring member 12 should be chosen as not to fatigue as the spring member is rotated.

FIG. 1B shows an exploded perspective view of a stop assembly 13 of the present invention. The stop assembly 13 includes a stop bracket 44, a stop pin 42, stop pin screws (46, 48), and bracket screws (52, 54) for attaching the stop assembly 13 to an existing hinge pin 50 on the vehicle. The stop bracket 44 includes an upper portion 62, a lower portion 64, and an intermediate portion 60. The intermediate portion 60 provides an offset between the upper portion 62 and the lower portion 64. The stop pin 42 fastens to the upper portion 62 of the stop bracket 44. As a result, the stop pin 42 can easily flex outward laterally, but is relatively rigid in the fore and aft direction. The stop pin 42 includes a semicircular groove 56 facing forward and a tapered face 58 facing backward. The semicircular groove 56 is positioned laterally to cradle a section of the spring member 12 (FIG. 1A) once the tailgate is installed. The semicircular groove can be replaced by a roller assembly, such as a one way roller.

Figure 2:
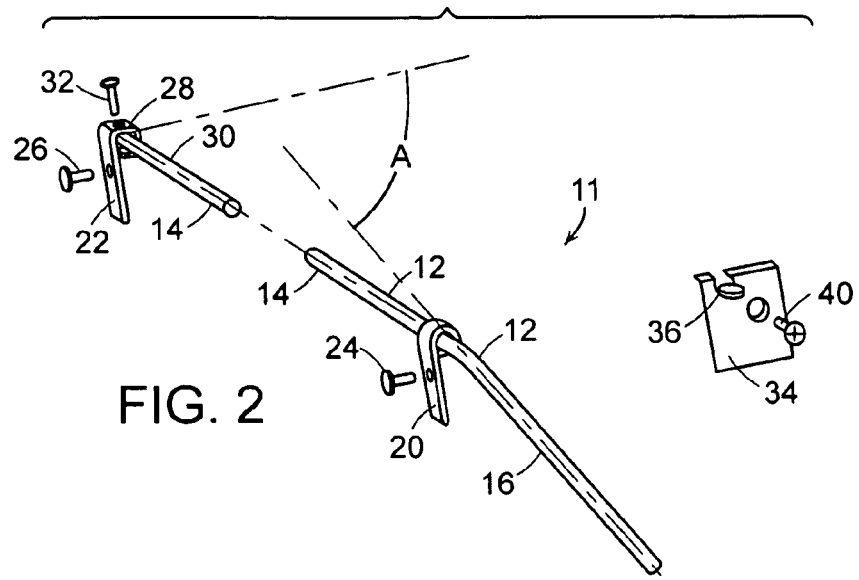
FIG. 2 shows a pretension angle "A" of a counterbalance assembly of FIG. 1.

FIG. 2 shows a pretension angle "A" of the counterbalance assembly 11. The spring member 12 is bent 90° to create a straight section 14 and a crank arm 16. Typically, a length of the straight section 14 is greater than a length of the crank arm 16. The straight section 14 includes a flat portion 30 that is disposed at an angle "A" (zero torque position) relative to a center axis of the crank arm 16, typically in the range of 60°. Bracket 22 includes a flat surface 28 for mating with the flat surface 30 of the straight section 14 such that free rotation of the counterbalance assembly 11 is prevented. Bracket 34 includes a lip 36 for holding the spring member 12 in a pretensioned position as described in further detail below. Pretensioning of the counterbalance assembly 11 is optional and provides for a greater restoring force than that of an assembly having no pretension.

Figure 3C:
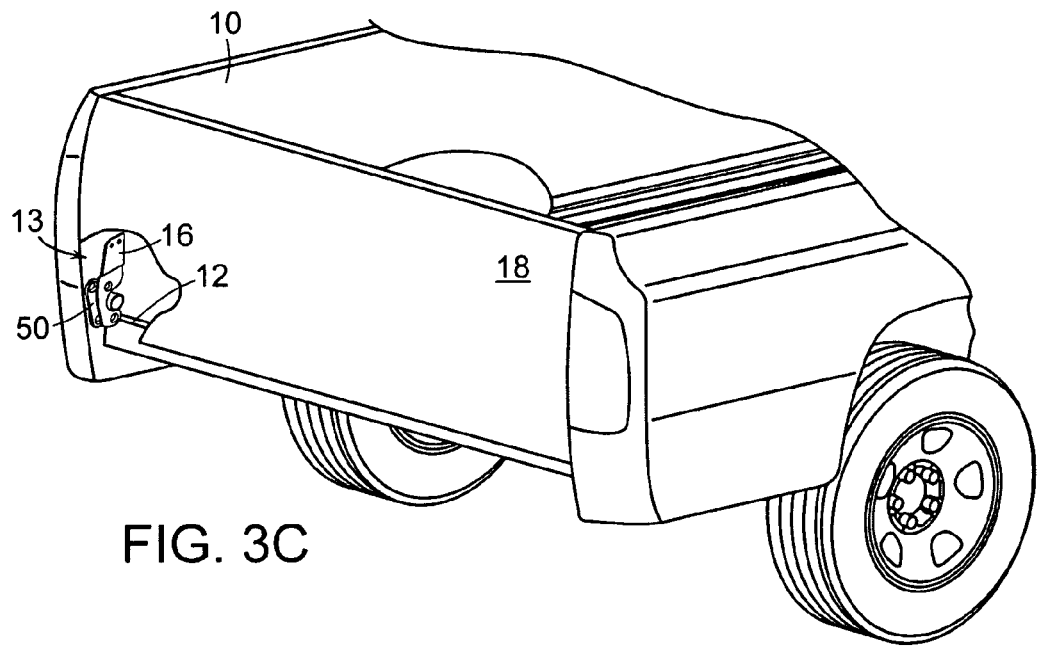
FIG. 3C illustrates installation of the tailgate to the vehicle.
Figure 3A:
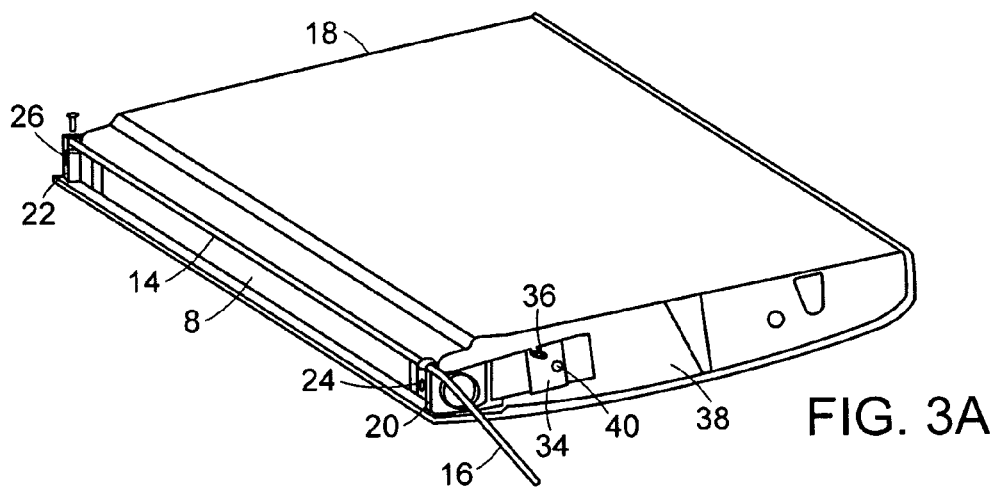
FIGS. 3A–3B illustrate installation of the present invention to a tailgate of a vehicle.
Figure 3B:
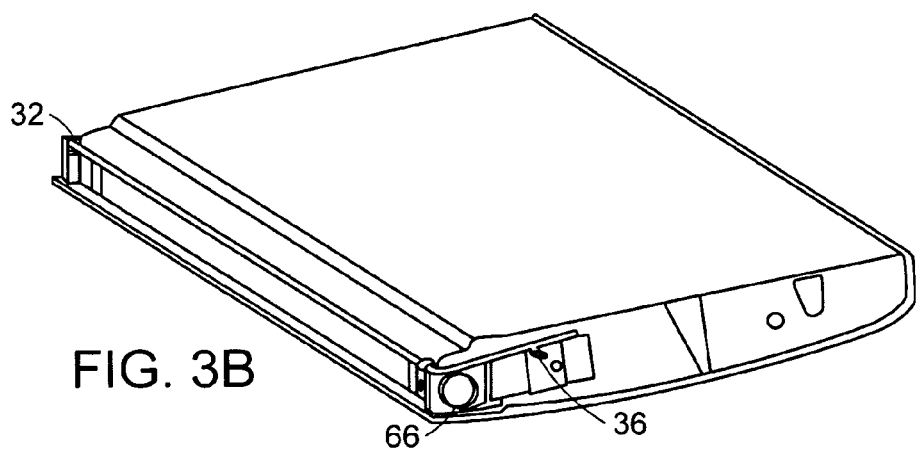

FIGS. 3A–3B illustrate the installation of the spring member 12 of the preceding figures. Brackets 20, 22 are attached to the bottom 8 of a tailgate 18 and bracket 34 is attached to a side 38 of the tailgate. The lip 36 of the bracket 34 should be on an edge inward toward a bed of a vehicle. Once the brackets 22, 24, 34 have been installed, the spring member 12 is inserted into brackets 20, 22 with the flat portion 30 of the straight section 14 aligned to fit into the respective flat mating surface 28 of the bracket 22 until the crank arm 16 hits the side 38 of the tailgate 18 as shown in FIG. 3A. The spring member 12 can freely slide in and out of the brackets 20, 22, but cannot rotate once the spring member 12 is engage with bracket 22.

The crank arm 16 can then be forced in a counterclockwise direction relative to FIGS. 3A and 3B until it clears the top of the lip 36 on the retaining bracket 34. At that time, the spring member 12 can be fully inserted into bracket 22 and secured with screw 32, as shown in FIG. 3B. The rotation of the crank arm 16 reduces angle "A" (FIG. 2) to approximately 0°. This reduction creates an amount of torque on the spring member 12 that left unrestrained by the lip 36 would restore the spring member 12 to its normal or zero torque position. Although the straight section 14 of the spring member 12 is shown across the entire length of the tailgate 18, it should be understood the length of the straight section 14 can be any length that provides a sufficient restoring force.

FIG. 3C shows a cutaway view of the tailgate 18 mounted to a vehicle 10. The tailgate 18 of FIGS. 3A and 3B is rotated to align with the vehicle 10 as shown. The stop assembly 13 can be mounted to an existing hinge pin 50 located on the vehicle 10. It should be understood that the tailgate 18 is mounted to the vehicle 10 in the conventional manner as known in the art. Installation of the tailgate 18 is described with reference to the preceding figures. First, a first trunnion 66 (FIG. 3B) can be inserted over a respective hinge pin 50 on a body of the vehicle 10, and while holding the tailgate 18 at an approximately 45° slant, a second trunnion (not shown) can slid over a slanted hinge pin (not shown), at that point the tailgate 18 can be closed.

In some instances, the stop pin 42 can obstruct the crank arm 16 as the tailgate 18 is lifted, but by virtue of its tapered face 58 (FIG. 1B) the stop bracket 44 and the crank arm 16 flex laterally out and in, respectively, to allow the crank arm 16 to pass into position. Once the crank arm 16 is past the stop pin 42, the stop bracket 44 and the crank arm 16 spring back into position laterally, and the crank arm 16 is captured by the groove 56 (FIG. 1B) of the stop pin 42. It should be realized that the flexing action described above is merely a convenience feature during the installation of the tailgate 18. The operation of the present invention would remain unchanged if the stop bracket 44 were rigid. Thus, the operator would merely be forced to hold the tailgate 18 straight up and down as he engages the first hinge pin, then lower it approximately 45 degrees to engage the second hinge pin.

FIGS. 4A–4D illustrate the opening of the tailgate 18 using the crank arm 16 of FIG. 2. The viewing angle of this illustration is looking through the near side of the vehicle 10 (FIG. 3C) in the direction of the hinge pin 50. The stop pin 42 is attached to the vehicle 10 and is stationary relative to movement of the tailgate 18.

Figure 4A:
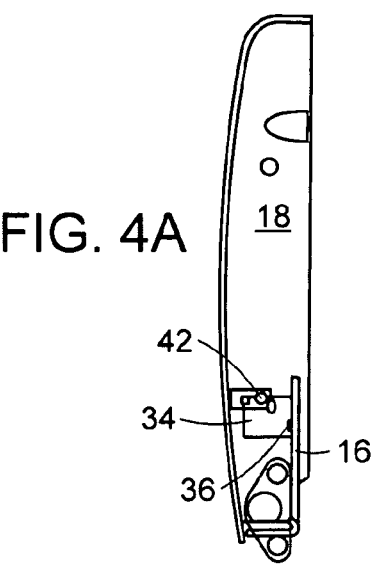
FIGS. 4A–4D illustrate the opening of the tailgate using the crank arm of FIG. 2.
Figure 4B:
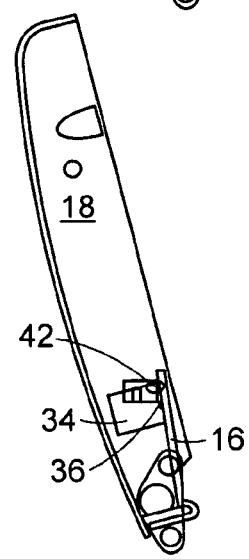
Figure 4C:
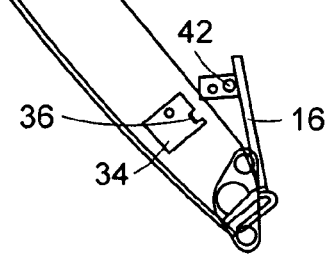
Figure 4D:
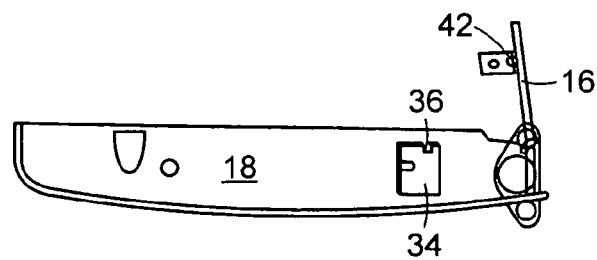

FIG. 4A shows the tailgate 18 in a closed position with the crank arm 16 remaining in the pretensioned position by the lip 36 of the bracket 34. There is approximately 15° of free travel of the tailgate 18 between the closed position and engagement of the spring member 12 and the stop pin 42. In this position the opening gravitational moment acting on the tailgate is very slight and the pretensioning of the torsion rod can be chosen to exceed it easily such that the tailgate is arrested in a "safety stop" position. As shown in FIG. 4B, the tailgate is engaged with the crank arm 16. Once the spring member 12 and the stop pin 42 are engaged, a counterbalance force or restoring force is applied to the tailgate 18 to assist an operator with either opening or closing the tailgate 18. That is, the spring member 12 tries to restore itself to the normal position as shown in FIG. 2. As the tailgate 18 is lowered further as shown in FIG. 4C, the amount of restoring force on the spring member 12 increases since the spring member 12 is rotated further from its normal position. The tailgate 18 is then dropped to the fully open position shown in FIG. 4D. At this point the amount of restoring force on the spring member 12 is greatest since the spring member 12 is rotated furthest from its normal position.

Figure 5:
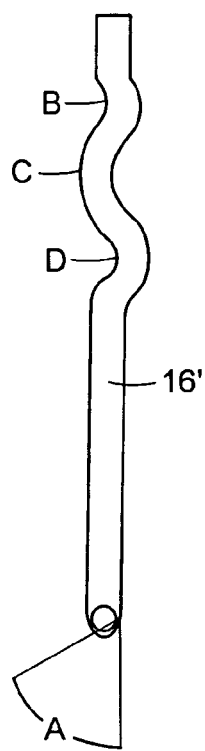
FIG. 5 shows another embodiment of a crank arm of the invention.

FIG. 5 shows another embodiment of the crank arm 16 of the preceding figures. The crank arm 16' is shaped to include two curved notches "B" and "D" and a curved section "C" for arresting or locking the tailgate 18 in predetermined positions as explained with reference to FIGS. 6A–6D. The notches "B" and "D" prevent the tailgate from inadvertent closure. It should be understood that any number of notches or curves can be used to arrest the tailgate in a predetermined position. Further, the deeper the notches the more force is required to move the tailgate from the predetermined position.

Figure 6A:
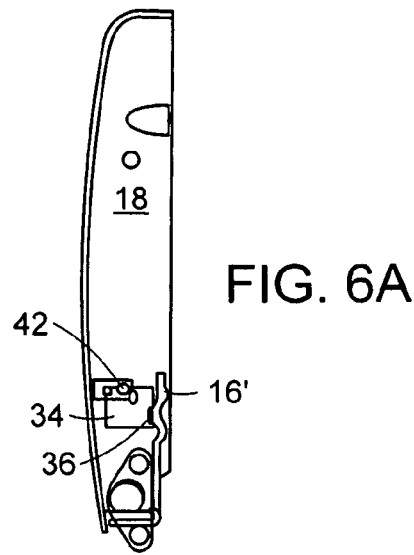
FIGS. 6A–6D illustrate the opening of the tailgate using the crank arm of FIG. 5.
Figure 6B:
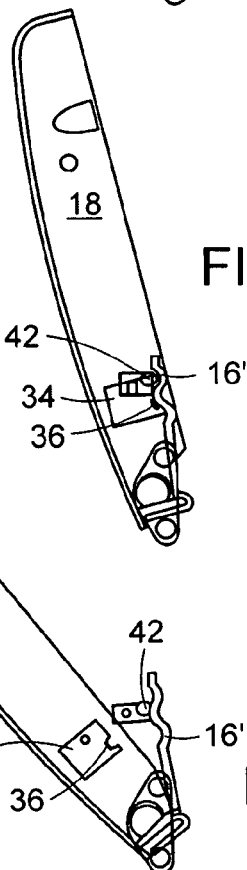
Figure 6C:
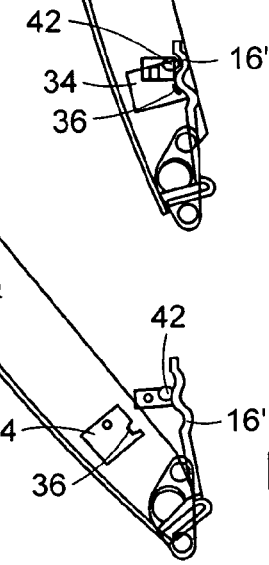
Figure 6D:
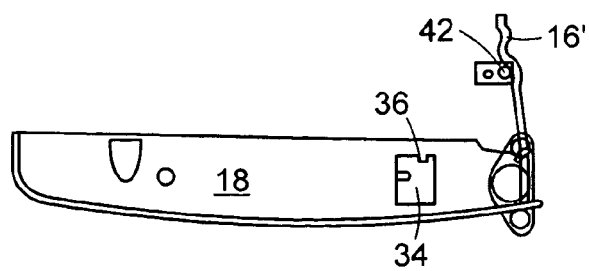

FIGS. 6A–6D illustrate the opening of the tailgate 18 using the crank arm 16' of FIG. 5. The viewing angle of this illustration is the same as the viewing angle as described with reference to FIGS. 4A–4D. FIG. 6A shows the tailgate 18 in a closed position with the crank arm 16' remaining in the pretensioned position by the lip 36 of bracket 34. There is approximately 15° of free travel of the tailgate 18 between the closed position and engagement of the spring member 12 and the stop pin 42. Once the spring member 12 and the stop pin 42 are engaged, a counterbalance force or restoring force is applied to the tailgate 18 to assist an operator with either opening or closing the tailgate 18. In this position the opening gravitational moment acting on the tailgate is very slight and the pre tensioning of the torsion rod can be chosen to exceed it easily such that tailgate is arrested in a "safety stop" position. As shown in FIG. 6B, the tailgate is held or locked in a "safety stop" or arrested position once the stop pin 42 engages notch "B" of the crank arm 16'. The notch "B" further enhances arresting the drop of the tailgate. The notch "B" of the crank arm 16' can be either straight or curved as shown. The curvature makes it possible to better counterbalance the sinusoidal gravitational pull by the linear stress-strain characteristic of the spring member 12. To lower the tailgate beyond this point requires the operator to pull the tailgate 18 in a downward direction past notch "B" as shown in FIG. 6C. The amount of restoring force on the spring member 12 increases since the spring member 12 is rotated further from its normal position. The tailgate 18 can then be dropped to the fully open position shown in FIG. 6D as the notch "D" of the crank arm 16' engages the stop pin 42. At this point the amount of restoring force on the spring member 12 is greatest since the spring member 12 is rotated furthest from its normal position. The depth of the notch "D" determines how firmly the tailgate is restrained in the open position, such as to prevent an inadvertent closure of the tailgate.

As an additional feature to cushion the drop of the tailgate, the sliding action of the crank arm 16 can be utilized to push against a viscous damper mounted on the truck just above the stop pin 42 (not shown).

While this invention has been particularly shown and described with references to preferred embodiments thereof, it will be understood by those skilled in the art that various changes in form and details may be made therein without departing from the scope of the invention encompassed by the appended claims. For example, the crank arm may terminate in a laterally positioned pin that rides up and down over a shaped cam surface mounted to the truck. Although the counterbalance assembly is shown to be in a pretension position, it should be understood that pretension is not necessary to provide the counterbalancing means.

What is claimed is:

1. A system for counterbalancing a tailgate of a vehicle, comprising:
    a stop assembly coupled to the vehicle; and
    a counterbalance assembly adapted to be coupled in a pretensioned position to an outer periphery of the tailgate, the counterbalance assembly providing a counterbalance force when engaged with the stop assembly while the tailgate is opened or closed and the counterbalance assembly, prior to engagement with the stop assembly, allowing for motion, without the counterbalance force, between closed and partially opened positions.

2. The system of claim 1, wherein the stop assembly is adapted to be coupled to an existing hinge pin of the vehicle.

3. The system of claim 1, wherein the stop assembly includes a semicircular groove for slidably engaging the counterbalance assembly.

4. The system of claim 1, wherein the stop assembly and the counterbalance assembly are coupled as not to interfere with removal of the tailgate from the vehicle.

5. The system of claim 1, wherein the stop assembly and the counterbalance assembly are adapted to be spring-loaded for ease of installation of the tailgate to the vehicle.

6. The system of claim 1, wherein the stop assembly or the counterbalance assembly is adapted to be spring-loaded for ease of installation of the tailgate to the vehicle.

7. The system of claim 1, wherein the counterbalance assembly includes a spring member comprising a first portion and a second portion that extends transversely from the first portion.

8. The system of claim 7, wherein the spring member is a torque rod.

9. A method of assembling a counterbalancing system for a tailgate of a vehicle, comprising:
    coupling a stop assembly to the vehicle; and
    coupling a counterbalance assembly adapted in a pretensioned position to an outer periphery of the tailgate, the counterbalance assembly providing a counterbalance force when engaged with the stop assembly while the tailgate is opened or closed and the counterbalance assembly, prior to engagement with the stop assembly, allowing for motion, without the counterbalance force, between closed and partially opened positions.

10. The method of claim 9, wherein the stop assembly is adapted to be coupled to an existing hinge pin of the vehicle.

11. The method of claim 9, wherein the stop assembly includes a semicircular groove for slidably engaging the counterbalance assembly.

12. The method of claim 9, wherein the stop assembly and the counterbalance assembly are coupled as not to interfere with removal of the tailgate from the vehicle.

13. The system of claim 9, wherein the stop assembly and the counterbalance assembly are adapted to be spring-loaded for ease of installation of the tailgate to the vehicle.

14. The system of claim 9, wherein the stop assembly or the counterbalance assembly is adapted to be spring-loaded for ease of installation of the tailgate to the vehicle.

15. The method of claim 9, wherein the counterbalance assembly includes a spring member comprising a first portion and a second portion that extends transversely from the first portion.

16. The method of claim 15, wherein the spring member is a torque rod.

17. A system for counterbalancing a tailgate of a vehicle, comprising:
    a stop assembly coupled to the vehicle; and
    a counterbalance assembly adapted to be coupled in a pretensioned position to an outer periphery of the tailgate, the counterbalance assembly providing a counterbalance force when engaged with the stop assembly while the tailgate is opened or closed, the counterbalance assembly including a spring member comprising a first portion and a second portion that extends transversely from the first portion, and the second portion including a first notch positioned proximal to and below an end of the spring member for engaging the stop assembly and arresting the tailgate in a first position.

18. The system of claim 17, wherein the first position allows the tailgate to be arrested in a partially opened position.

19. The system of claim 17, wherein the second portion includes a second notch positioned proximal to and below the first notch for engaging the stop assembly and arresting the tailgate in a second position.

20. The system of claim 19, wherein the second position allows the tailgate to be arrested in a fully opened position.

21. A method of assembling a counterbalancing system for a tailgate of a vehicle, comprising:
    coupling a stop assembly to the vehicle; and
    coupling a counterbalance assembly adapted in a pretensioned position to an outer periphery of the tailgate, the counterbalance assembly providing a counterbalance force when engaged with the stop assembly while the tailgate is opened or closed, the counterbalance assembly including a spring member comprising a first portion and a second portion that extends transversely from the first portion, and the second portion including a first notch positioned proximal to and below an end of the spring member for engaging the stop assembly and arresting the tailgate in a first position.

22. The method of claim 21, wherein the first position allows the tailgate to be arrested in a partially opened position.

23. The method of claim 21, wherein the second portion includes a second notch positioned proximal to and below the first notch for engaging the stop assembly and arresting the tailgate in a second position.

24. The method of claim 23, wherein the second position allows the tailgate to be arrested in a fully opened position.

25. A system for counterbalancing a tailgate of a vehicle, comprising:
    means for coupling a stop assembly to the vehicle; and
    means for coupling a counterbalance assembly adapted in a pretensioned position to an outer periphery of the tailgate, the counterbalance assembly providing a counterbalance force when engaged with the stop assembly while the tailgate is opened or closed and the counterbalance assembly, prior to engagement with the stop assembly, allowing for motion, without the counterbalance force, between closed and partially opened positions.

26. A system for counterbalancing a tailgate of a vehicle, comprising:
    a stop assembly coupled to the vehicle; and
    a counterbalance assembly adapted to be coupled to an outer periphery of the tailgate, the counterbalance assembly providing a counterbalance force when engaged with the stop assembly while the tailgate is opened or closed and the counterbalance assembly, prior to engagement with the stop assembly, allowing for motion, without the counterbalance force, between closed and partially opened positions.

* * * * *